Sept. 15, 1953  G. A. ARGABRITE  2,652,499
ALPHA RADIATION DETECTOR
Filed Dec. 20, 1949
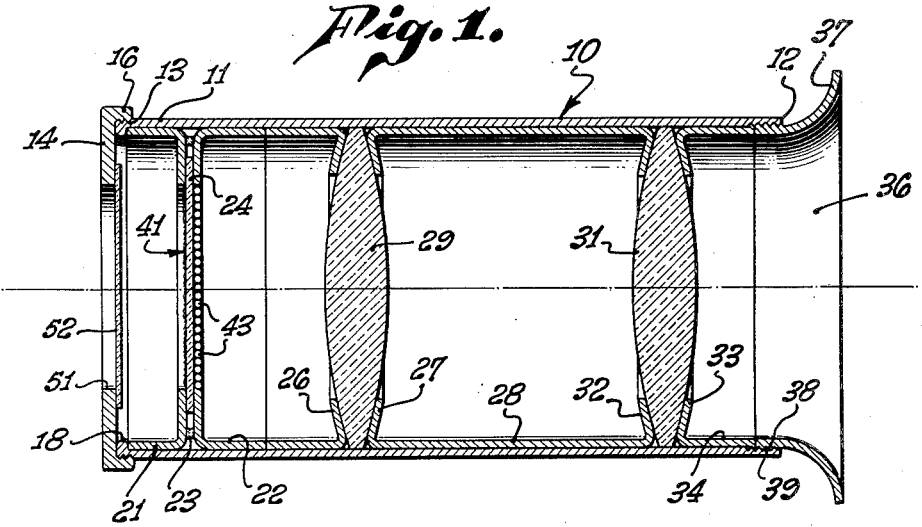
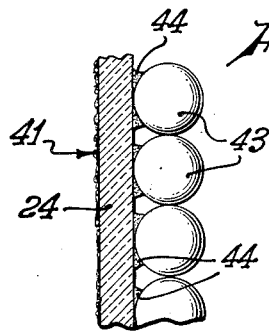
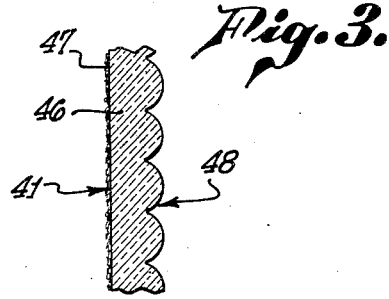
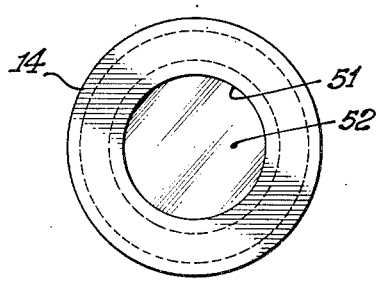
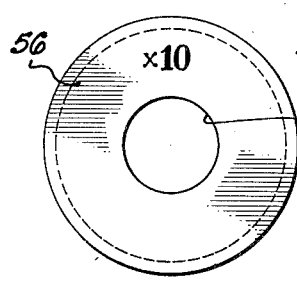
GEORGE A. ARGABRITE,
INVENTOR.
BY
ATTORNEY.

UNITED STATES PATENT OFFICE 2,652,499

ALPHA RADIATION DETECTOR

George A. Argabrite, North Hollywood, Calif., assignor, by mesne assignments, to Pacific Transducer Corporation, Los Angeles, Calif., a corporation of California Application December 20, 1949, Serial No. 134,052

3 Claims. (Cl. 250—77)

This invention relates generally to a device for detecting alpha radiation from radioactive materials, and more particularly to such a device which is easily portable and which operates by direct visual observation of scintillations caused by alpha radiation.

With the increasing importance of radioactive elements, it has become highly desirable that mineral deposits of such elements be discovered in order that they may be made available for industrial and other purposes. Present instruments having acceptable quantitative accuracy for detection of such mineral desposits are very complex and consequently expensive to manufacture. Their cost has prevented their wide scale use by individual prospectors and other persons whose explorations and discoveries could be of great importance in exploiting the radioactive mineral wealth of the earth.

In addition to the problem of locating radioactive mineral deposits, modern industrial establishments working with radioactive materials must take many precautions to prevent possible harm arising from contact by persons with such materials or with other material contaminated by exposure to sources of radioactivity. The provision of a reliable, quantitatively accurate detector of alpha radiation will enable those responsible for safety to quickly determine whether a situation offers substantial danger to personnel or equipment undergoing prolonged exposure thereto.

It has long been known that certain phosphor materials exhibit the phenomenon of scintillating when struck by an alpha particle. Such scintillations are relatively bright but are very minute. It has been found that the scintillations may be counted, and that the number observed per unit time gives an accurate relative measurement of the radioactivity of the material emitting alpha radiation. In order to count the scintillations, it has been necessary in the past to observe them under a microscope and in virtual darkness. These inconveniences have thus far made the scintillation method impracticable for quick use in detecting alpha radiation, especially where quantitatively accurate results are needed rapidly, and where the bulkiness and delicacy of a conventional microscope are disadvantageous.

A further problem encountered in counting scintillations is that of luminescence of the phosphor material. The material normally used is zinc sulfide activated by a small quantity of one of the metals, copper, silver, bismuth, manganese, or to a lesser extent by other metals. Each crystal of zinc sulfide thus prepared not only scintillates upon being struck by an alpha particle, but also has the quality of glowing or luminescing for a long time after being exposed to an external source of visible light. This luminescence tends to obscure scintillations, thus greatly increasing the difficulty of counting them accurately.

The present invention, in the form of a device weighing approximately one quarter pound, provides means for accurately measuring alpha radiation by the method of counting scintillations, and its requires no external magnifying means for observing the scintillations. Furthermore, my device does not require total darkness for successful use, and in its preferred form includes means for quenching the luminescence of the phosphor material to further facilitate observation and accurate counting. As will become apparent from the accompanying drawing and following description, the light-diffusing means associated with the phosphor material are scattered substantially statistically with respect to the individual phosphor crystals, with the result that a counting of scintillations (each manifested by a glowing of the light-diffusing means) yields a quantitatively accurate measure of the alpha radiation emitted by the sample.

It is an object of my invention, therefore, to disclose a novel, portable detector for alpha radiation operating by direct visual observation of scintillations caused by such radiation.

Another object of my invention is to provide such a detector having an accuracy comparable to that of electronic devices.

Still another object is to provide such a device usable in subdued light.

A further object is to disclose an alpha radiation detector with means for making quantitative measurements over a plurality of ranges.

A still further object of my invention is to disclose means for quenching the luminescence of the phosphor material used in my detector.

Another object is to provide a device of the above character which may be conveniently disassembled for periodic cleaning or replacement of its component parts.

Another object is to disclose a device having the above features which is light in weight, which is small enough to be carried in one's pocket and which can be manufactured at a very low cost.

These and other objects of my invention will become clear from a study of the following description taken in connection with the accompanying drawing, in which:

Fig. 1 is a longitudinal sectional view of a preferred embodiment of my invention.

Fig. 2 is a fragmentary sectional view on a greatly enlarged scale of a portion of the device.

Fig. 3 is a fragmentary sectional view on the same scale as that of Fig. 2, showing a structure alternative to that of Fig. 2.

Fig. 4 is an end view taken from the left side of Fig. 1.

Fig. 5 is an elevational view of a calibratically apertured shield for use with my invention.

In general, the preferred embodiment of my invention includes a tubular housing having two open ends and carrying near one end, transverse to the axis of the housing, a thin layer of phosphor substance which is adapted to be struck by alpha radiation from a sample when the detector is held adjacent said sample. Such phosphor material is preferably in crystalline form, and each time an alpha particle impinges one of the crystals, the crystal is caused to scintillate.

Spaced a very short distance from the layer of phosphor material is a light-diffusing material which operates to optically enlarge the minute scintillations of the phosphor material. An optical system, including one or more lenses, is provided to facilitate observation of the scintillation as enlarged and diffused by the light-diffusing material. I preferably provide a plurality of calibrated apertures whereby the range of my device may be greatly increased without sacrificing quantitative accuracy.

Referring now in detail to the drawings, and particularly to Fig. 1 thereof, a hollow cylindrical housing indicated generally at 10 has a detecting end 11 and a viewing end 12. Detecting end 11 is provided with an externally threaded portion 13 to which may be screwed a cap 14 provided with an internally threaded annular flange 16.

On detecting end 11 the wall of housing 10 is slightly peened inwardly, as shown at 18, in order to hold in place the several elements of my device slidably carried within housing 10. Adjacent peened end 18 are two annular brackets 21 and 22, preferably brazed together as at 23, the brackets 21 and 22 being slidably mounted within housing 10. Between brackets 21 and 22, and extending transversely of housing 10, is held a sheet 24 of transparent material such as cellophane or the like. Upon sheet 24 are carried certain phosphor material and diffusing means to be described later in connection with Figs. 2 and 3, these elements constituting the detecting element of my invention. On the end of bracket 22 distant from bracket 21 is formed an inturned annular lip 26 which cooperates with a similar, oppositely disposed lip 27 formed on slidable bracket 28 in holding lens 29 in position concentric with housing 10. A second lens 31 is carried within housing 10 and is held in position by inturned annular lip 32 of bracket 28 in cooperation with lip 33 of slidable bracket 34.

On the viewing end 12 of housing 10, I preferably provide an eyepiece 36 having an outwardly flared portion 37 adapted to minimize the amount of external light received by the eye when using the instrument. Eyepiece 36 is preferably attached to housing 10 by external threads 38 engaging internal threads 39 formed in housing 10 adjacent the viewing end 12 thereof, thus holding the slidable elements of my invention in assembled relation within housing 10.

With particular reference to Fig. 2, I there show, in greatly enlarged detail, the structure comprising the radiation detecting element of my invention. Sheet 24 is provided on its surface facing the detecting end 11 of housing 10 with a layer of phosphor material indicated generally at 41. Phosphor material 41 may be any substance capable of scintillating upon being impinged by an alpha particle. Among such substances are naphthalene, cadmium tungstate, and crystals of zinc sulfide activated by traces of copper, silver, bismuth or manganese. Of these I have found that copper- or silver-activated zinc sulfide crystals yield the most satisfactory results.

In order that the scintillation of an impinged crystal may be visible to the observer, and since the crystals themselves are substantially opaque, phosphor material 41 should be placed upon sheet 24 in a very thin layer, preferably one crystal deep. This may be accomplished by coating the surface of sheet 24 with a transparent adhesive, thinly spread, and sprinkling the prepared surface with zinc sulfide crystals.

On the opposite surface of sheet 24 are attached, as by a transparent adhesive 44, a number of microspheres 43. Each microsphere 43 is preferably formed of a transparent, moldable, organic material, having a diameter in the range of .015" to .025". The material of which the microspheres are made may be an acrylic resin, for example methyl methacrylate, a polystyrene, or any of many cellulosic derivatives, for instance cellulose acetate. Glass may also be used with satisfactory results. I have found that the refractive index of the material used is not critical. Microspheres 43 are placed on sheet 24 as close together as possible, preferably in contact with one another, and are held in place by transparent glue 44.

In Fig. 3 is shown, on substantially the same scale as Fig. 2, an alternative form of phosphor material and associated diffusing means, in accordance with my invention. Instead of sheet 24 shown in Fig. 2, the structure in accordance with Fig. 3 provides a lenticular film 46 having a flat surface 47 and a lenticulated surface indicated generally at 48. Flat surface 47 faces toward detecting end 11 of housing 10. Upon surface 47 is placed phosphor material 41 in crystalline form, as in the structure described in connection with Fig. 2. The lenticulated surface 48 of film 46 is provided with a lenticular configuration which may assume the form of semi-cylinders, hemispheres, or other similar shapes adapted to afford the desired refraction.

It will be noted in Fig. 1 that sheet 24 and its associated phosphor substance 41 are located relatively close to detecting end 11 of housing 10 when my device is assembled. As is well known, the mean free path in air of alpha particles is in the range of 3 to 10 centimeters, depending in part upon the substance emitting the alpha radiation. It is therefore important that any radiation detecting means be positioned close to the sample whose radiation is to be measured.

When my device is in operation, cap 14 is removed from detecting end 11 of housing 10, and it can be seen that alpha radiation entering housing 10 through the detecting end thereof will impinge phosphor material 41. Each time an alpha particle impinges one of the crystals constituting phosphor material 41, that crystal will scintillate for a very short period of time. It will be recalled that in the placing of the phosphor material upon sheet 24, it is important that the phosphor material be only one crystal deep because of its opacity to visible light. The scintillation of a crystal will thus be enlarged and diffused by the nearest microsphere 43, thus producing a very greatly enlarged instantaneous glow. The lens system, preferably comprising lenses 26 and 27 as described above, then enables the eye of the observer positioned adjacent eyepiece 36 to see the instantaneous glow.

It will be evident that many scintillations will occur during a given time interval and the number of scintillations occurring during, say one minute, is a measure of the radioactivity of the sample. When copper- or silver-actuated zinc sulfide crystals have been exposed to visible light they luminesce for a substantial period of time, and this luminescence renders less visible the scintillations caused by alpha radiation impinging the crystals. I have found that the luminescence can be conveniently quenched by exposing the zinc sulfide crystals to red light having a wavelength in the vicinity of 6,500 to 7,000 Angstrom units. I therefore provide a transparent filter transmitting light only in that spectral band for use in conjunction with my detector proper. Such a filter is conveniently carried as part of protecting cap 14 and, as seen most clearly in Fig. 4, cap 14 is provided with a central aperture 51 across which extends filter 52 which may be a tinted piece of cellophane or similar material.

In this way phosphor material 41 is habitually exposed to quenching light entering through filter 52 and will not luminesce. Since even a very thin layer of cellophane or the like is sufficient to prevent virtually all alpha radiation from passing, it is evident that cap 14 must be removed when my detector is in actual use, such use being preferably in subdued light or semi-darkness so that scintillations of phosphor material 41 and the resultant glow of microspheres 43 will be easily visible to the observer.

In order to enlarge the usable range of my detector, I may provide one or more shields each having a calibrated aperture therein. When a sample is being examined the observer will have difficulty counting scintillations accurately when such scintillations occur at a rate substantially greater than about fifty to seventy per minute. If the radioactivity being examined is greater than this figure, the observer may place on detecting end 11 of housing 10 a shield 56 (see Fig. 5) having a calibrated aperture 57 formed centrally therein. Shield 56 is preferably provided with an internally threaded flange adapted to fit threaded portion 13 of housing 10 so that the shield may be conveniently attached to or removed from housing 10 in the same manner as in the case of cap 14. Each shield 56 is plainly marked with the multiplying factor to be applied to readings obtained therethrough as exemplified by the inscription "×10" in Fig. 5. Since alpha particles are virtually completely stopped by the solid portion of shield 56, it is evident that only a fraction of the particles which otherwise would enter the open end of housing 10 will do so when shield 56 in placed thereon.

Thus I have provided a light, easily portable detector for alpha radiation having a quantitatively accurate range which may be extended to measure as intense alpha radiation as desired.

As pointed out above, the operative elements of my invention carried within housing 10 are slidable therein and are held in position by removable eyepiece 36. The device may therefore be conveniently disassembled for periodic cleaning of its optical surfaces, or for replacement or repair of its operative elements. I may attach eyepiece 36 to housing 10 by means of a conventional bayonet type fastening, or other suitable attaching means instead of the threaded connection described above.

No skill is demanded of the user beyond the ability to count and to measure a time interval, and after some familiarity gained by using the instrument an observer can within a few seconds recognize a situation potentially dangerous to life because of the high alpha radiation shown by the instrument. Furthermore, the instrument can be made and sold at a very low cost and can thus be made available in large numbers to employees in industrial establishments using radioactive materials and to amateur geologists and explorers in locating radioactive mineral deposits.

Although I have described certain embodiments of my invention herein, including modifications and changes as shown, I do not wish to be limited thereto. All changes and modifications within the spirit of the invention are intended to be included in the scope of the following claims.

I claim:

1. A device for optically detecting alpha radiation from a radioactive sample comprising: a housing having an open detecting end and an open viewing end; a sheet of transparent material carried by said housing and extending transversely of the housing adjacent the detecting end thereof; a layer of phosphor substance carried on the surface of said sheet facing said detecting end; a layer of virtually transparent, substantially contiguous light-refracting particles carried on the surface of said sheet facing said viewing end, said particles having diameters of less than 0.05 inch; and a lens spaced from said layer of particles and carried by the housing adjacent said viewing end having a field of view including said light-refracting particles.

2. A device as stated in claim 1 wherein said light-refracting material comprises a plurality of spherical particles.

3. A device as stated in claim 1 wherein a cap is removably carried by the light detecting end of the cylindrical housing.

GEORGE A. ARGABRITE.

References Cited in the file of this patent

UNITED STATES PATENTS

| Number | Name | Date |
|---|---|---|
| 787,170 | Glew | Apr. 11, 1905 |
| 1,242,377 | Schmidt | Oct. 9, 1917 |
| 1,385,657 | Bell et al. | July 26, 1921 |
| 1,812,058 | Paul | June 30, 1931 |
| 1,902,440 | Gill, Jr. | Mar. 21, 1933 |
| 2,051,208 | Greenwood | Aug. 18, 1936 |
| 2,334,765 | Hermann | Nov. 23, 1943 |
| 2,363,600 | Lawlor | Nov. 28, 1944 |
| 2,513,805 | Kanne | July 4, 1950 |

FOREIGN PATENTS

| Number | Country | Date |
|---|---|---|
| 519,901 | Great Britain | July 27, 1939 |